US006385718B1

(12) United States Patent
Crawford et al.

(10) Patent No.: US 6,385,718 B1
(45) Date of Patent: *May 7, 2002

(54) COMPUTER SYSTEM AND METHOD FOR EXECUTING INTERRUPT INSTRUCTIONS IN OPERATING MODES

(75) Inventors: John H. Crawford; Donald Alpert, both of Santa Clara, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/919,570

(22) Filed: Aug. 29, 1997

Related U.S. Application Data

(63) Continuation of application No. 08/534,305, filed on Sep. 27, 1995, now abandoned, which is a continuation of application No. 08/229,052, filed on Apr. 18, 1994, now abandoned, which is a continuation of application No. 07/763,989, filed on Sep. 23, 1991, now abandoned.

(51) Int. Cl.[7] ............................ G06F 9/44; G06F 9/455; G06F 13/24
(52) U.S. Cl. ..................... 712/227; 712/229; 709/107; 703/23; 703/26; 710/266
(58) Field of Search .................... 395/500, 384, 395/570, 500.18, 500.47, 500.48, 500.49; 364/DIG. 1; 703/26, 29, 23; 712/1, 43, 227, 229, 244; 710/266; 709/107; 707/512, 526; 345/520, 503, 551

(56) References Cited

U.S. PATENT DOCUMENTS

| | | | | |
|---|---|---|---|---|
| 4,580,240 A | * | 4/1986 | Watanabe | 395/425 |
| 4,739,475 A | * | 4/1988 | Mensch, Jr. | 364/200 |
| 4,812,975 A | * | 3/1989 | Adachi et al. | 395/500 |
| 4,876,639 A | * | 10/1989 | Mensch, Jr. | 364/200 |
| 4,926,322 A | * | 5/1990 | Stimac et al. | 395/500 |
| 4,928,237 A | * | 5/1990 | Bealkowski et al. | 395/500 |
| 5,003,466 A | * | 3/1991 | Schan, Jr. et al. | 395/575 |
| 5,018,062 A | * | 5/1991 | Culler et al. | 395/425 |
| 5,027,273 A | * | 6/1991 | Letwin | 395/400 |
| 5,088,033 A | * | 2/1992 | Binkley et al. | 395/500 |
| 5,109,329 A | * | 4/1992 | Streliott | 395/725 |
| 5,117,488 A | * | 5/1992 | Noguchi et al. | 712/200 |
| 5,125,087 A | * | 6/1992 | Randell | 395/425 |
| 5,132,971 A | * | 7/1992 | Oguma et al. | 371/16.2 |
| 5,282,269 A | * | 1/1994 | Willems et al. | 395/510 |
| 5,392,408 A | * | 2/1995 | Fitch | 711/202 |
| 5,432,935 A | * | 7/1995 | Kato et al. | 395/700 |

FOREIGN PATENT DOCUMENTS

EP 0297339 1/1989

OTHER PUBLICATIONS

Turley, "Advanced 80386 Programming Techniques", pp. 169–197 and 283–315, 1988.*
Clif Purkiser,"Intel's 386 Unites Unix and DOS Software", Mini–Micro Systems, Apr. 1987, pp. 113–124.

* cited by examiner

Primary Examiner—Daniel H. Pan
(74) Attorney, Agent, or Firm—Blakely, Sokoloff, Taylor & Zafman LLP

(57) ABSTRACT

A computer system including a given microprocessor specifically designed to operate in a virtual operating mode allows a software program previously written for an earlier designed single program microprocessor to execute in a protected, paged, multi-tasking environment under a particularly designed host operating software program. The system also includes means for executing software interrupt (INTn) instructions, using emulation software forming part of the host program in order to emulate the way in which these instructions would have been executed by the earlier microprocessor. As a unique improvement to this overall computer system, certain ones of the INTn instructions are executed by means of emulation software while others are executed by means of the previously written program in cooperation with the given microprocessor and its host operating software program.

14 Claims, 2 Drawing Sheets

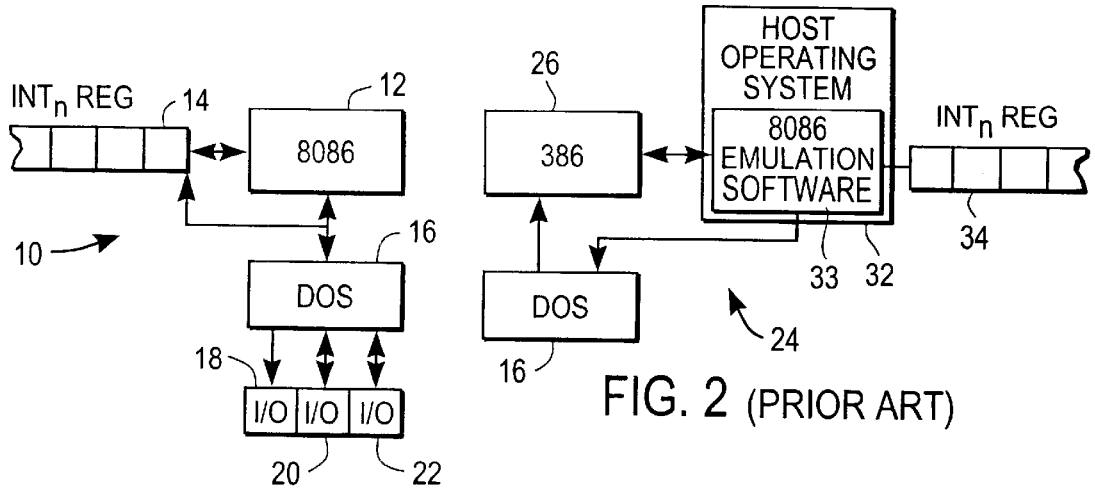
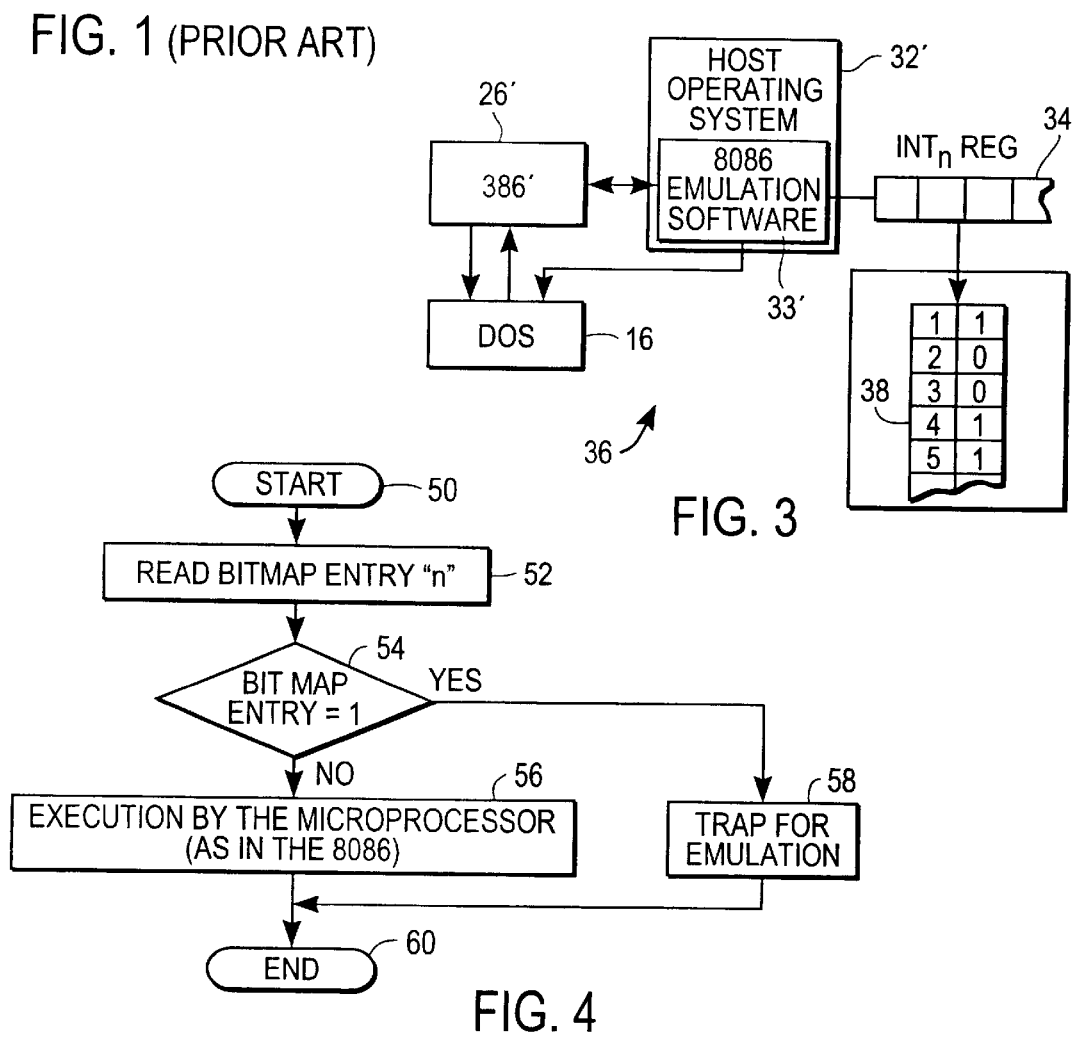

COMPUTER SYSTEM AND METHOD FOR EXECUTING INTERRUPT INSTRUCTIONS IN OPERATING MODES

This is a continuation of application Ser. No. 08/534,305, filed Sep. 27, 1995 now abandoned which is a continuation of application Ser. No. 08/229,052 filed Apr. 18, 1994, now abandoned which is a continuation of application Ser. No. 07/763,989 filed Sep. 23, 1991, now abandoned.

FIELD OF THE INVENTION

The present invention relates generally to a computer system including a given microprocessor specifically designed to operate in a virtual operating mode that allows a software program previously written for an earlier designed single program microprocessor to execute in a protected, paged, multi-tasking environment under a particularly designed host operating software program. The present invention relates more particularly to an improvement in the way in which the given microprocessor and its host operating software program handle software interrupt instructions (INTn instructions) using emulation software forming part of the host program in order to emulate the way in which those instructions would have been executed by the earlier microprocessor.

BACKGROUND OF THE INVENTION

In the discussion immediately above, reference was made to a given microprocessor, to a previously written software program, to an earlier designed single program microprocessor, and to a particularly designed host operating software program. In the actual practice of the present invention, the given microprocessor specifically refers to an improvement to Intel Corporation's 80386 and 80486™ microprocessor, hereinafter merely referred to as the 386 microprocessor since the invention is equally applicable to both. The earlier designed single program microprocessor refers to Intel Corporation's earlier designed single program 8086 microprocessor. The previously written software program refers to any of a number of different programs including specifically DOS programs that were previously written for the 8086 microprocessor. Finally, the host operating software program refers to any suitable host or central control operating system such as WINDOWS™ software by Microsoft or UNIX™ system software by AT&T, both written specifically for the given microprocessor so that the latter can operate in the virtual operating mode described above. While the present invention will be described hereinafter in relation to the Intel 386 (and 486™) and 8086 microprocessors, the previously written DOS programs, and a WINDOWS or UNIX operating system, it is to be understood that the present invention is not limited to those particular microprocessors, to those previously written software programs, or to those particular central operating systems. With that understanding in mind, a brief history of the 8086 and the 386 microprocessors will immediately follow. A more detailed discussion of those microprocessors as they relate specifically to the present invention will be provided in the

DETAILED DESCRIPTION

It can be stated, without reservation, that Intel Corporation's earlier 8086 microprocessor was so highly successful that there were many software programs written for it. However, given that this microprocessor was to be the first of a series of subsequently improved microprocessors, it did have its limitations. One in particular, although it was not necessarily considered a limitation at the time, was the inability of the microprocessor to act on more than one software program at a time. This, of course, meant that the program itself did not have to execute in a protected, paged, multi-tasking environment. However, as the technology evolved, Intel Corporation eventually developed its 386 microprocessor which, as stated previously, is capable of running a number of programs using a more sophisticated central operating system such as WINDOWS or UNIX. At the same time, the 386 microprocessor was designed to operate in a virtual 8086 operating mode that allowed multiple software programs previously written for the earlier 8086 microprocessor to be used and specifically to execute in a protected, paged, multi-tasking environment under the more sophisticated central operating system, even though those earlier software programs were not intended to execute in that manner. There were just too many earlier programs to allow them to become obsolete. Therefore, whenever changes are made to successors of the 8086 microprocessor, compatibility with earlier 8086 software is always a consideration.

While compatibility between Intel's present microprocessors and the earlier written software is, indeed, important, there are instances in which this objective compromises certain other operational aspects of the overall computer system. Such is the case in the execution of software interrupt instructions (INTn instructions). As will be discussed in more detail hereinafter, the present 386 microprocessor is designed to execute all INTn instructions using emulation software forming part of the host program in order to emulate the way in which these instructions would have executed by the earlier 8086 microprocessor. While the number of executions of these particular instructions is a relatively small percentage of the total instructions executed by means of emulation, they account for a relatively large amount of execution time. One particular solution to this problem which has been proposed heretofore is to allow all of the INTn instructions to be executed by the software program itself in conjunction with the microprocessor and its host operating program without using the emulation software, that is, without trapping the INTn instructions in the host operating program's emulation software or emulator as it may be called. Applicants have found that this previous approach does save computing time generally (for the whole system) and emulation time in particular where the particular INTn instruction is simple, for example asking for the time, or even somewhat more complex, for example printing a character. However, Applicants have also discovered that for the more highly complex INTn instructions, for example reading a file, it is more efficient to allow those particular instructions to be trapped in and executed by the emulation software.

SUMMARY OF THE INVENTION

In view of the foregoing, it is a primary object of the present invention to actually reduce the time required to execute INTn instructions by a computer system of the type described above.

As will be seen hereinafter, a computer system is disclosed herein including a given microprocessor, for example the 386 microprocessor, which is specifically designed to operate in a virtual operating mode that allows a software program, for example a DOS program previously written for an earlier designed single program microprocessor, for example the 8086 microprocessor, to execute in a protected, paged, multi-tasking environment under a particularly designed host operating software program, for example WINDOWS or UNIX. This system also includes means forming part of the given microprocessor and the host operating software program for executing INTn instructions using emulation software forming part of the host program in order to emulate the way in which the instructions would have been executed by the earlier microprocessor.

In order to reduce the time it takes for the computer system generally and the emulation software in particular to execute INTn instructions during the virtual operating mode of the computer system, means are provided for causing certain ones of the INTn instructions to be executed by means of the emulation software while allowing certain others of the INTn instructions to be executed by means of the previously written program, but not by means of the emulation software. In the specific embodiment disclosed herein, the overall system is provided with a bit map including a series of bits, one for each of the INTn instructions. Each of these bits is placed in either an emulating first state or a non-emulating second state. Means are also provided for causing all of the INTn instructions associated with the emulating first state of the bit map to be executed by means of the emulation software while allowing all of the INTn instructions associated with the non-emulating second state of the bit map to be trapped in and execute by the previously written program in cooperation with the given software in the host operating software program, but not by means of the emulation software. In other words, the present invention provides for taking some but not all of the INTn instructions out of the hands of the emulator. In that way, those INTn instructions to be emulated and those that are not to be emulated can be preselected depending upon the complexity of the particular instructions so as to minimize the overall time it takes to execute all of the instructions. This is to be contrasted first with the computer system including the existing 386 microprocessor which executes all INTn instructions by means of emulation and second with the previously proposed modification to the 386 system which executes none of the INTn instructions by means of emulation. The present invention provides the best of both of these approaches as regards the execution of INTn instructions.

BRIEF DESCRIPTION OF THE DRAWINGS

The present invention will be described in more detail hereinafter in conjunction with the drawings, wherein:

FIG. 1 diagrammatically illustrates certain aspects of a prior art computer system including the earlier 8086 microprocessor;

FIG. 2 is a similar view of a computer system including the earlier 386 microprocessor, specifically illustrating the way in which it executes INTn instructions by means of emulation;

FIG. 3 is a diagrammatic illustration of a computer system which executes INTn instructions in accordance with the present invention;

FIG. 4 is a flow diagram depicting the way in which the computer system illustrated in FIG. 3 executes INTn instructions in accordance with the present invention.

DETAILED DESCRIPTION

Figure 5:
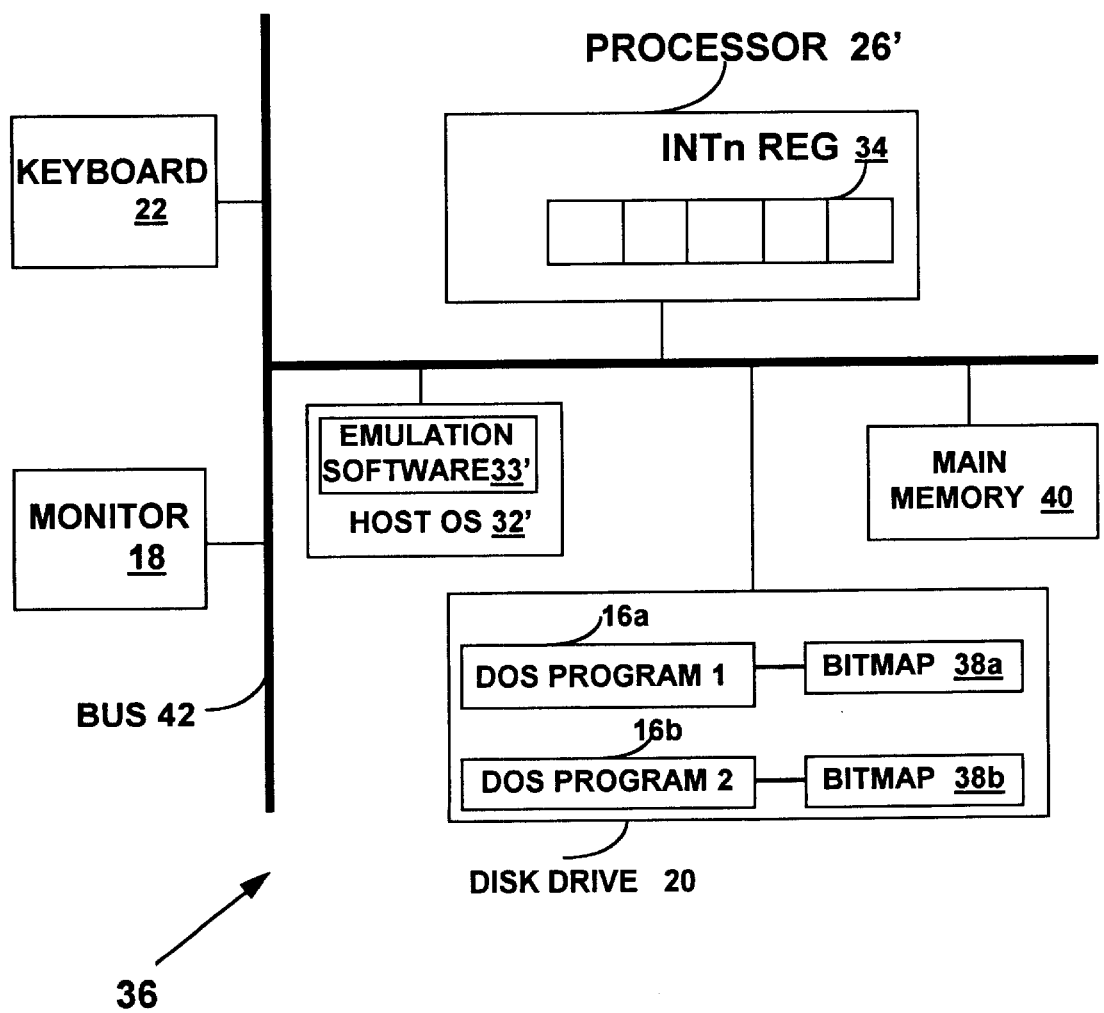
FIG. 5 is a block diagram illustrating the overall system including the processor and bitmaps associated with various programs.

Turning now to the drawings, attention is first directed to FIG. 1 which, as indicated above, is a diagrammatic illustration of certain aspects of a prior art computer system including the earlier 8086 microprocessor. The overall computer system is generally indicated by the reference numeral 10. While this particular system includes a number of components not illustrated, it is specifically shown including an 8086 microprocessor 12 having an INTn register 14, a single DOS software program 16 and a number of I/O peripherals 18, 20 and 22, for example a monitor, a disk drive and a keyboard, respectively, although the present invention is not limited to these particular I/O devices. The INTn register 14 actually communicates with an address table (not shown) containing different execution addresses depending upon the particular INTn instruction in question. In system 10 there are 256 possible INTn instructions 0–255, each being characterized by a specific operand (n) for indexing into the table. Examples of DOS interrupt vectors (n) include:

MS-DOS terminate process,
MS-DOS function dispatcher,
MS-DOS terminate address
MS-DOS Ctrl-C handler address,
MS-DOS critical-error handler address,
MS-DOS absolute disk read,
MS-DOS absolute disk write,
MS-DOS terminate and stay resident,
MS-DOS idle interrupt,
MS-DOS reserved,
MS-DOS network redirector
MS-DOS reserved
MS-DOS multiplex interrupt
MS-DOS reserved Having described computer system 10 thus far, attention is now directed to the way in which this system handles INTn instructions from software program 16. Assume, for example, that program 16 initiates INTn instruction INTn 21. The operand "21" is placed into the INTn register 14 which is used to index the address table which contains the beginning address of a particular execution routine associated with that instruction. This is done through the microprocessor hardware in conjunction with the single DOS program 16.

Turning now to FIG. 2, attention is directed to a more advanced computer system which is generally indicated by the reference numeral 24. Among other differences between this system and system 10, system 24 includes the 386 microprocessor indicated at 26 and is capable of operating simultaneously on more than one software program including programs previously written for the 8086 microprocessor, although only one such program, for example, the DOS program 16, is shown. As a result of this ability to operate on multiple software programs simultaneously, and the desire to use 8086 software, the 386 microprocessor was designed to operate in a particular virtual operating mode, as stated previously, that is an operating mode that allows 8086 programs, for example, DOS program 16, to execute in a protected, paged, multi-tasking environment under a host operating system. As also stated previously, one such host or central operating system is the previously recited WINDOWS or UNIX program which is diagrammatically depicted at 32 in FIG. 2. This program is written to include 8086 emulation software 33, hereinafter sometimes referred to merely as an emulator 33, for executing certain sensitive interrupt related instructions including specifically software interrupt instructions (INTn instructions) from the previously written program 16 by means of the emulation software 33 in order to emulate the way in which the instructions would have been executed by the earlier 8086 microprocessor. In this regard, system 24 includes an INTn register 34 corresponding in function to INTn register 14. While not shown, system 24 would also include I/O peripherals such as those illustrated in FIG. 1.

With computer system 24 described thus far, attention is now directed to the way in which the system handles interrupts in its virtual operating mode. Specifically, when a particular INTn instruction in one of the software programs is being operated upon, for example, program 16, its operand is delivered to register 34. From there, the software interrupt instruction is trapped in the emulator 33 of the host operating program 32 and executed by means of the emulation software 33 in order to emulate the way in which the instructions would have been executed by the earlier 8086 microprocessor 12. All INTn instructions are executed in this way. This has been found to take a disproportionate amount of the emulator's execution time considering the rather small number of INTn instructions being executed. An approach which has previously been proposed to solve this problem has been to eliminate all trappings of INTn instructions in the emulator 33. Thus, according to that proposal, all 256 INTn instructions are handled outside the emulator 33, that is, by DOS program 16 itself in conjunction with the microprocessor 26 and the host operating program 32.

As indicated previously, while it is quite time consuming to trap and emulate all INTn instructions, it could be even more time consuming to allow software program 16 and the other corresponding programs to execute all of the INTn instructions outside the emulator 33. Again, this is because some of the INTn instructions may be so complex as to require the software programs in conjunction with the microprocessor 26 and the host operating program 32 to carry out additional subroutines not required by the emulator 33. As will be seen immediately below, the present invention eliminates the problem.

Turning now to FIG. 3 and FIG. 5, attention is directed to a further computer system 36 and specifically one which is designed in accordance with the present invention. System 36 includes a modified 386 microprocessor 26', depicted in as a 386' microprocessor. This microprocessor, like the 386 microprocessor shown in FIG. 2, is specifically designed to operate in a virtual operating mode that allows multiple previously written 8086 software programs including, for example, DOS program 16 to execute in a protected, paged, multi-tasking environment under a particularly designed host operating software program 32' having its own 8086 emulation software 33 in the same manner as system 24. System 36 is also shown including corresponding INTn register 34 and, while not shown in FIG. 3 includes I/O peripherals in the same manner as system 10 as shown in FIG. 5, including the monitor 18, the disk drive 20 in which is stored a first DOS program 16a and its associated bitmap 38a, and a second DOS program 16b and its associated bitmap 38b, and the keyboard 22 previously discussed with reference to FIG. 1. In addition, system 36 includes a bit map 38 containing a series of 256 bits, one for each of the 256 INTn instructions. Each bit is in either an emulating first state, designated for example by a one, or a non-emulating second state designated for example by a zero. Microprocessor 26' and host operating software program 32' are designed to cause all of the INTn instructions associated with the emulating first state to be executed by means of the emulation software 33 while allowing all of the INTn instructions associated with the non-emulating second state to be executed by means of the previously written DOS program 16 in cooperation with the microprocessor 26 and host operating software programs 32, but not by means of the emulation software 33. The bitmap 38 in the host operating software program as shown in FIG. 5.

Whether a particular bit within bit map 38 is in its emulating first state or its non-emulating second state is determined by the programmer and incorporated into the host operating software program 32. This determination is based on the complexity of each of the INTn instructions. As a general rule, those instructions that are so complex that they would take longer to execute outside the emulator 33, for example disk I/O, are allowed to trap within the emulator 33 in the same manner as system 24. On the other hand, the simpler INTn instructions can be executed outside the emulator 33 faster than they can by means of emulation and therefore are executed by means of the previously written software system in cooperation with the microprocessor 26 and host operating program 32. While this is generally the criteria for setting the various bits in bit map 38, it should be apparent that the programmer could take into account other criteria. The point of the present invention is that the programmer is given this flexibility.

Having described computer system 36 and the way in which it differs from system 24 and the previous proposal for modifying system 24, it is to be understood that the present invention is not limited to Intel Corporation's 386 microprocessor and its associated components, its i486™ microprocessor, or any related microprocessor, although the present invention is especially applicable to such microprocessors. Moreover, it should be apparent from the foregoing that the present invention relates specifically to the handling of INTn instructions and that only those features have been described. Obviously, each of the systems illustrated FIG. 3 and FIG. 5 includes other components not pertinent to the present invention. Those components and any component not shown but necessary to the way in which the systems operate to handle INTn instructions would be obvious to one with ordinary skill in the art.

Having described the way in which computer system 36 handles INTn instructions and its advantages over the prior art and the previously proposed system, attention is directed to FIG. 4. This figure depicts a flow chart of the way in which system 36 selectively handles INTn instructions in the manner described previously. In view of this particular flow chart and the teachings herein, one with ordinary skill in the art could readily practice the invention.

Turning now to FIG. 4, a flow chart is illustrated there, depicting the way in which computer system 36 shown in FIG. 3 and FIG. 5 handles INTn instructions in accordance with the present invention, while the flow chart should be self-explanatory, a brief description will be provided here. As seen there, the first decision to be made for a particular INTn instruction is to determine from the bit map if "un" has been assigned a 1 or a 0. If "n" is a 1, then the instruction is executed by means of emulation and the process ends. If "n" is a 0, then the instruction is executed by the microprocessor (including its microcode) as in the 8086 processor and the process ends.

What is claimed is:

1. In a method of operating a computer system including a microprocessor which operates in a virtual operating mode that allows an existing program previously written for an earlier microprocessor to execute in a protected, paged, multi-tasking environment under a host operating software program, said host operating software program having emulation software for emulating the way interrupt (INTn) instructions in said existing program would have been executed by said earlier microprocessor, said method comprising:

(a) providing a user programmable mode bit map resident in said host operating software program, said mode bit map including a series of mode bits corresponding to said INTn instructions, said mode bits designating at least one of an emulating first state and a non-emulating second state, wherein a selection to emulate an instruction or to execute an instruction without emulation is based on a period time consumed to emulate a respective instruction;

(b) if said INTn instruction designates said emulating first state, then executing said INTn instruction using said emulation software; and (c) if said INTn instruction designates said non-emulating second state, then executing said INTn instruction without emulation via said existing program previously written.

2. A computer system, comprising:

a microprocessor to execute existing programs designed for an earlier designed microprocessor;

a host operating software program including an emulation software program for emulating the way instruction interrupts residing in said existing programs would have been executed by said earlier microprocessor; and a user programmable bit map said bitmap including a series of mode bits corresponding with said interrupt instructions, said mode bits designating whether said interrupt instructions are executed in at least one of an emulating mode and a non-emulating mode via said existing programs, wherein a selection to emulate an instruction or to execute an instruction without emulation is based on a period time consumed to emulate a respective instruction.

3. The computer system of claim 2, wherein said bit map resides in said host operating software program.

4. The computer system of claim 2, including an emulation logic circuit coupled to said microprocessor for executing, by said emulation software, said INTn instructions designated to be executed in said emulating mode, and for executing, by said existing program, said INTn instructions designated to be executed in said non-emulating mode.

5. The computer system of claim 2, further including an identification logic circuit for identifying whether said mode bits in said mode bit map designate said INTn instructions to be executed in at least one of said emulating mode and said non-emulating mode.

6. A computer system for executing an interrupt (INTn) instruction residing in an existing program designed for an earlier microprocessor, said computer system operating in a multi-tasking environment under a host operating program, said host operating software program having emulation software for emulating the way said INTn instruction would have been executed by said earlier microprocessor, said system comprising:

a microprocessor;

a main memory coupled to said microprocessor for storing said host operating program and said existing program; and a user programmable mode bit map, resident in said host operating software program, said mode bit map having a plurality of mode bits that designate whether an INTn instruction of said existing program is to be executed via an emulation mode or executed via a non-emulation mode via said existing program, wherein a selection to emulate an instruction or to execute an instruction without emulation is based on a period time consumed to emulate a respective instruction.

7. An operating system executable by a microprocessor of a first type capable of executing a set of instructions executable on a microprocessor of a second type, said operating system comprising:

a user programmable bit map including a series of mode bits corresponding to said instructions, said mode bits designating whether an instruction of said set of instructions is emulated when executed on said microprocessor of said first type, or executed on said microprocessor of said first type without emulation via said set of instructions executable on microprocessor of a second type, wherein a selection to emulate an instruction or to execute an instruction without emulation is based on a period time consumed to emulate a respective instruction.

8. The operating system of claim 7, wherein said set of instructions include interrupt instructions.

9. The operating system of claim 8, wherein said microprocessor of said second type is an earlier designed microprocessor with respect to said microprocessor of said first type.

10. The operating system of claim 9, further including an emulator for emulating execution of said set of instructions when executed on said microprocessor of said first type, as said instructions would be executed on said microprocessor of said second type.

11. The operating system of claim 10, wherein said operating system is capable of performing multitasking operations.

12. The operating system of claim 11, wherein said microprocessor of said first type is capable of executing in a virtual mode including a protected, paged, and multitasking environment, and wherein said microprocessor of said second type is unable to execute in said virtual mode.

13. A computer system comprising of:

a first type of microprocessor capable of executing a set of instructions written for a second type of microprocessor; and a user programmable bit map including a series of mode bits corresponding to said instructions, said mode bits designating whether a respective instruction of said set of instructions is to be emulated when executed on said first type of microprocessor, as said respective instruction would have been executed on said second type of microprocessor, or executed on said first type of microprocessor without emulation via said set of instructions executable on microprocessor of a second type, wherein a selection to emulate an instruction or to execute an instruction without emulation is based on a period time consumed to emulate a respective instruction.

14. A computer system comprising of:

a microprocessor of a first type capable of executing a set of instructions executable on a microprocessor of a second type;

an emulator for emulating execution of said set of instructions when executed on said microprocessor of said first type, as said instructions would be executed on said microprocessor of said second type; and a user programmable bit map including a series of mode bits, said mode bits corresponding to said set of instructions, said mode bits designating whether a corresponding instruction of said set of instructions is to be emulated when executed on said microprocessor of said first type, or executed without emulation via said set of instructions executable on microprocessor of a second type when executed on said microprocessor of said first type.

* * * * *

UNITED STATES PATENT AND TRADEMARK OFFICE
CERTIFICATE OF CORRECTION

PATENT NO. : 6,385,718 B1
DATED : May 7, 2002
INVENTOR(S) : Crawford et al.

It is certified that error appears in the above-identified patent and that said Letters Patent is hereby corrected as shown below:

<u>Title page,</u>
Item [57], ABSTRACT,
Line 3, before "allows", insert -- that --.

<u>Column 3,</u>
Line 25, replace "execute", with -- executed --.

<u>Column 4,</u>
Line 56, before "an", insert -- in --.

<u>Column 6,</u>
Line 51, replace "un", with -- n --.

<u>Column 8,</u>
Line 65, replace ".", with -- , wherein a selection to emulate an instruction or to execute an instruction without emulation is based on a period time consumed to emulate a respective instuction. --

Signed and Sealed this

Twenty-ninth Day of October, 2002

*Attest:*

JAMES E. ROGAN
*Attesting Officer*  *Director of the United States Patent and Trademark Office*